(12) United States Patent
Neal et al.

(10) Patent No.: US 11,674,305 B1
(45) Date of Patent: Jun. 13, 2023

(54) ROOF TOP THERMAL ENERGY STORAGE SYSTEM UTILIZING PHASE CHANGE MATERIAL

(71) Applicants: Orville Thomas Neal, Boulder City, NV (US); Fran Lanciaux, Perrysburg, OH (US)

(72) Inventors: Orville Thomas Neal, Boulder City, NV (US); Fran Lanciaux, Perrysburg, OH (US)

( * ) Notice: Subject to any disclaimer, the term of this patent is extended or adjusted under 35 U.S.C. 154(b) by 184 days.

(21) Appl. No.: 16/363,867

(22) Filed: Mar. 25, 2019

Related U.S. Application Data

(60) Provisional application No. 62/647,439, filed on Mar. 23, 2018.

(51) Int. Cl.
| | |
|---|---|
| *E04D 3/18* | (2006.01) |
| *E04B 1/76* | (2006.01) |
| *F16L 59/02* | (2006.01) |
| *F16L 59/08* | (2006.01) |
| *F28D 20/02* | (2006.01) |

(52) U.S. Cl.
CPC .......... *E04B 1/7629* (2013.01); *F16L 59/026* (2013.01); *F16L 59/028* (2013.01); *F16L 59/08* (2013.01); *F28D 20/021* (2013.01); *E04B 2001/7691* (2013.01)

(58) Field of Classification Search
CPC ........... F28D 2020/0008; F28D 20/023; F28D 20/021; F24S 20/66; F24S 80/60; F24S 20/63; F24S 20/67; F24F 5/0021; F24F 2221/14; E04B 1/7629; E04B 2001/7691; F16L 59/08; F16L 59/028; F16L 59/026
See application file for complete search history.

(56) References Cited

U.S. PATENT DOCUMENTS

| | | | | |
|---|---|---|---|---|
| 4,498,459 A * | 2/1985 | Korin | ...................... | F28D 20/02 126/618 |
| 4,572,864 A * | 2/1986 | Benson | .................. | F28D 20/023 428/305.5 |
| 5,626,936 A * | 5/1997 | Alderman | ............... | F24S 20/61 428/68 |
| 5,770,295 A * | 6/1998 | Alderman | ............... | F24S 20/61 428/68 |
| 6,645,598 B2 * | 11/2003 | Alderman | ............... | B29C 65/18 428/69 |
| 6,811,852 B2 * | 11/2004 | Alderman | ......... | B29C 66/72341 428/69 |
| 7,077,124 B2 * | 7/2006 | Szymocha | ............... | F24S 50/00 126/643 |

(Continued)

FOREIGN PATENT DOCUMENTS

WO WO-2009018016 A2 * 2/2009 ............. F28D 20/02

*Primary Examiner* — Basil S Katcheves
(74) *Attorney, Agent, or Firm* — FisherBroyles, LLP; Rob L. Phillips

(57) ABSTRACT

A system including modular units of packaged phase change material; means to secure the modular units of packaged phase change material to a roof of a structure; and wherein the phase change material being packaged in an infrared reflective and ultraviolet stable material. A housing may also be used to retain the modular units of packaged phase change material. The phase change material serves to reduce the energy load of the structure.

9 Claims, 5 Drawing Sheets

(56) References Cited

U.S. PATENT DOCUMENTS

| | | | |
|---|---|---|---|
| 7,797,950 B2 * | 9/2010 | Brower | F24F 5/0021 |
| | | | 62/55.5 |
| 8,156,703 B2 * | 4/2012 | Alderman | B32B 3/12 |
| | | | 52/309.13 |
| 9,115,498 B2 * | 8/2015 | Shiao | E04D 5/12 |
| 9,359,766 B2 * | 6/2016 | Shiao | E04B 1/80 |
| 9,695,349 B1 * | 7/2017 | Neal | C09K 5/063 |
| 10,634,371 B2 * | 4/2020 | Radzinsky | F24F 5/0092 |
| 2009/0011171 A1 * | 1/2009 | Alderman | E04B 1/78 |
| | | | 428/72 |
| 2010/0127000 A1 * | 5/2010 | Horwath | F28D 20/02 |
| | | | 220/592.01 |
| 2013/0061846 A1 * | 3/2013 | Colson | F24S 20/61 |
| | | | 126/617 |

* cited by examiner

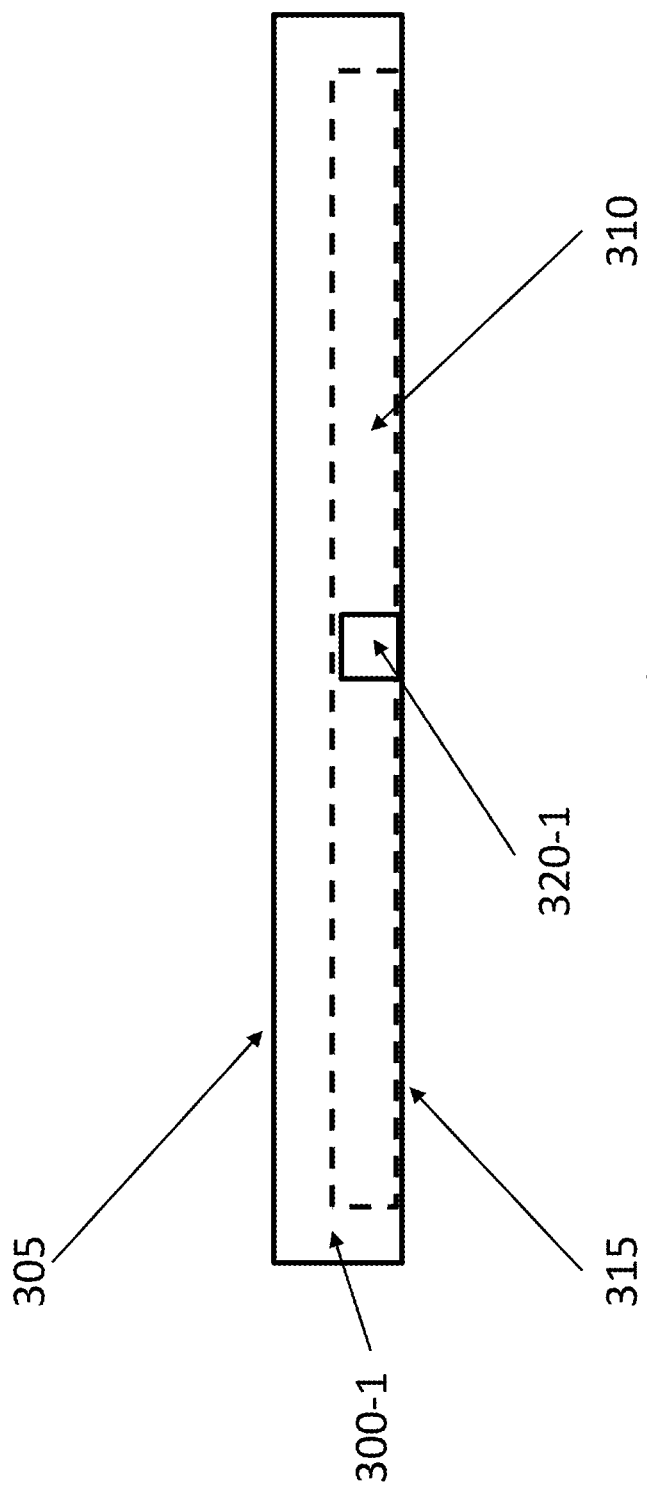

ROOF TOP THERMAL ENERGY STORAGE SYSTEM UTILIZING PHASE CHANGE MATERIAL

CROSS-REFERENCE

This application claims priority to U.S. Application No. 62/647,439 filed Mar. 23, 2018 which is incorporated herein for any and all purposes.

FIELD OF THE INVENTION

The embodiments of the present invention relate to a thermal energy system configured to attach to or lay on the roof of a structure to absorb and resist heat transfer thereby reducing cooling loads for said structure.

BACKGROUND

The transfer of heat into a structure from the ambient environment directly effects the efficiency of an air conditioning system configured to cool the interior of the structure. That is, the faster heat enters the interior of the structure, the more the air conditioning must work to maintain a constant temperature. Roof structures are a significant source of heat transfer. Conventional insulation has been used to reduce unwanted heat transfer near the roof of structures.

While insulation is effective to reduce heat transfer near roofs of structures, it would be advantageous to develop a more effective and efficient system for reducing such heat transfer.

SUMMARY

Accordingly, a first system embodiment of the present invention comprises: modular units of packaged phase change material; means to secure said modular units of packaged phase change material to a roof of a structure; and wherein said phase change material is packaged in an infrared reflective and ultraviolet stable material.

A first method embodiment of forming a thermal storage system comprises: positioning a plurality of modular units of packaged phase change material on a roof of a structure, said packaged phase change material being packaged in an infrared reflective and ultraviolet stable material.

The phase change material serves to capture solar heat before the solar heat can enter the structure while the IR reflective and UV stable surface serves to reflect additional thermal energy. In this manner, the cooling load needed to maintain a cool interior temperature is reduced.

Other advantages, objects, variations and embodiments of the present invention will be readily apparent from the following drawings, detailed description, abstract and claims.

DETAILED DESCRIPTION

Figure 1:
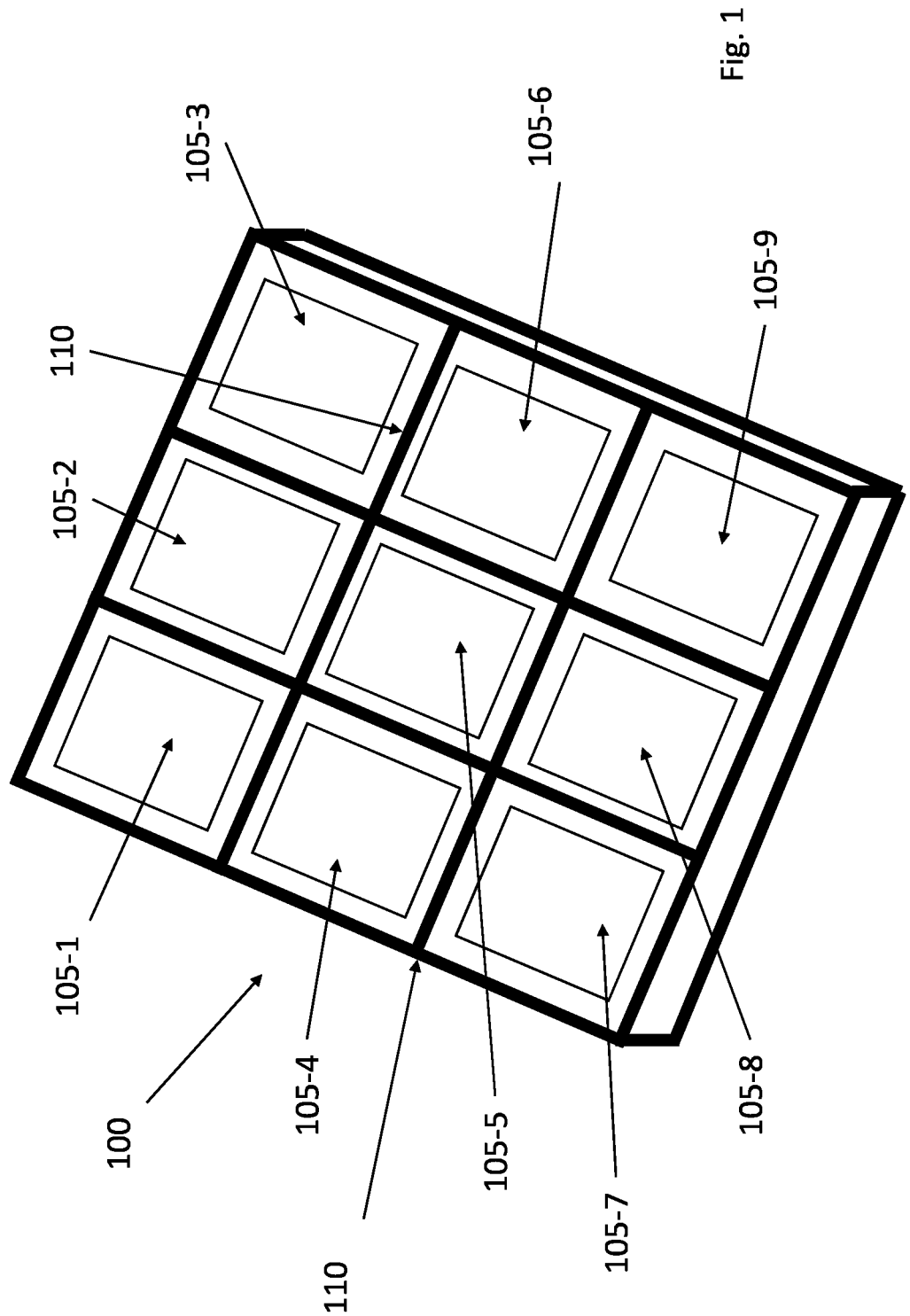
FIG. 1 illustrates an exemplary modular unit of packaged phase change material according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention claimed.

Phase change materials are solid at room temperature but as the temperature increases the phase change materials liquefy and absorb and store heat. Conversely, when the temperature decreases, the phase change materials solidify and emit heat. Known phase change materials include, but are not limited to, perlite, paraffin compounds (linear crystalline alkyl hydrocarbons), sodium sulfate, fatty acids, salt hydrates and calcium chloride hexahydrate. While this list is not exhaustive, it is representative of the materials which exhibit properties common to phase change materials.

U.S. Pat. Nos. 7,735,327 and 7,797,950 assigned to Neal Energy Management, LLC, and incorporated herein by this reference, disclose packaged phase change material of the type that may be used as modular units of packaged phase change material (see FIG. 1 herein). Those skilled in the art will recognize that the other styles of modular units of packaged phase change material may be used. Indeed, the modular units of packaged phase change material may take any form suitable to serve the purpose of absorbing solar heat and releasing stored heat as needed.

FIG. 1 shows an exemplary modular unit 100 comprising a series of separate pouches 105-1 through 105-9. While nine pouches 105-1 through 105-9 are shown, any number of pouches may be utilized and the modular unit 100 may be larger or smaller. In one embodiment, the phase change material composition is sealed in poly-vinyl-foil laminated pouches. The poly-vinyl-foil is an infrared reflective and ultraviolet stable material. A plurality of multiple polyvinyl-foil laminated pouches 105-1 through 105-9 are then joined to a substrate (e.g., insulation tile) to form the modular unit 100. In one embodiment, to maintain the effectiveness of the poly-vinyl-foil laminated pouches 105-1 through 105-9, the seals 110 should be clean and deep or wide enough to form a vapor barrier. In one embodiment, the seals 110 of the poly-vinyl-foil laminated pouches 105-1 through 105-9 are at least ¼" deep from outer edge to the phase change material composition in the poly-vinyl-foil laminated pouches 105-1 through 105-9 to form a vapor barrier.

Depending on the embodiment, the shape of the modular units may take on various dimensions and geometries, including spheres, plates, squares or rectangles. The modular nature of the modular units of packaged phase change material render installation simpler. Securing the modular units of packaged phase change material to the roof of the structure may be accomplished using any number of technologies including mechanical fasteners, adhesives, magnets, etc. It is also conceivable that the weight of the modular units of phase change material is adequate to secure them in place on the roof.

Figure 2:
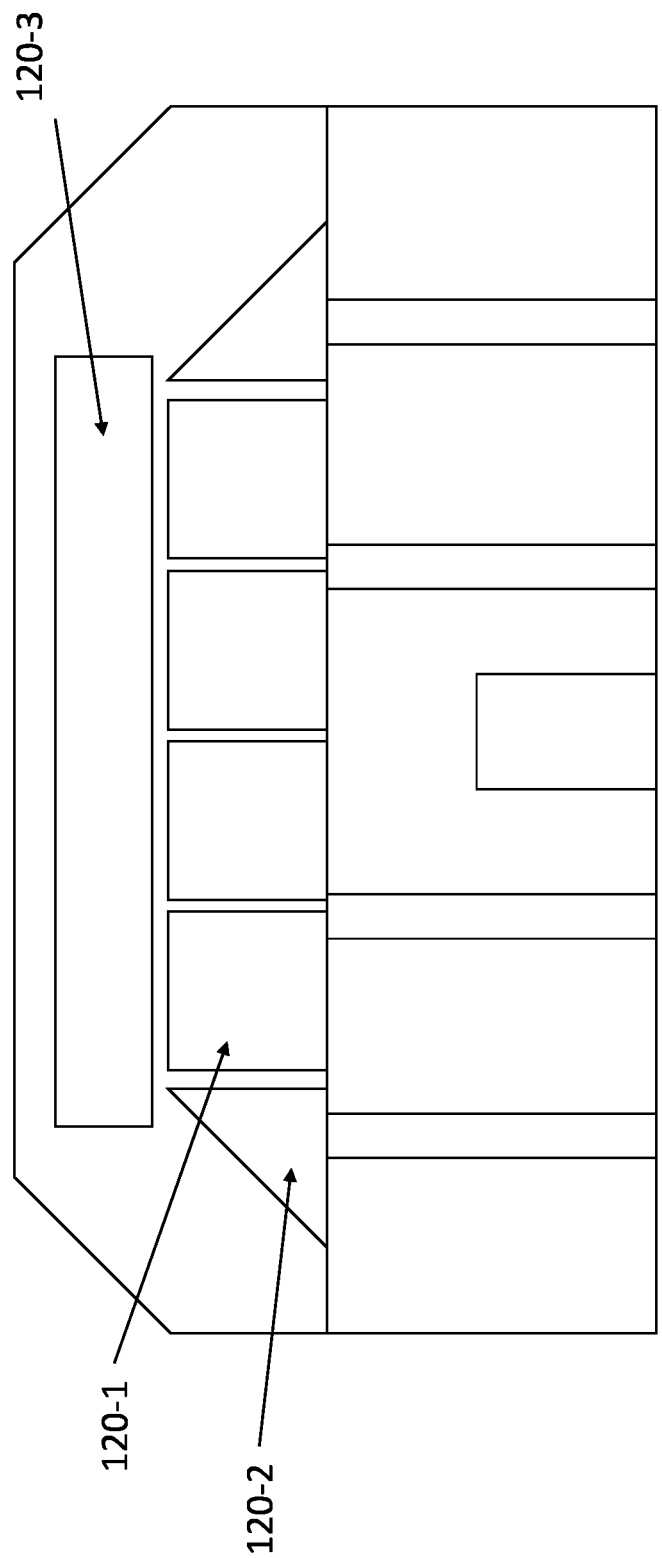
FIG. 2 illustrates a roof with a plurality of modular units of packaged phase change material installed thereon according to the embodiments of the present invention.

FIG. 2 shows a series of modular units of packaged phase change material installed on a roof. As shown, the modular units of packaged phase change material take on square 120-1, triangular 120-2 and rectangular 120-3 geometries to accommodate the roof geometry.

Figure 3:
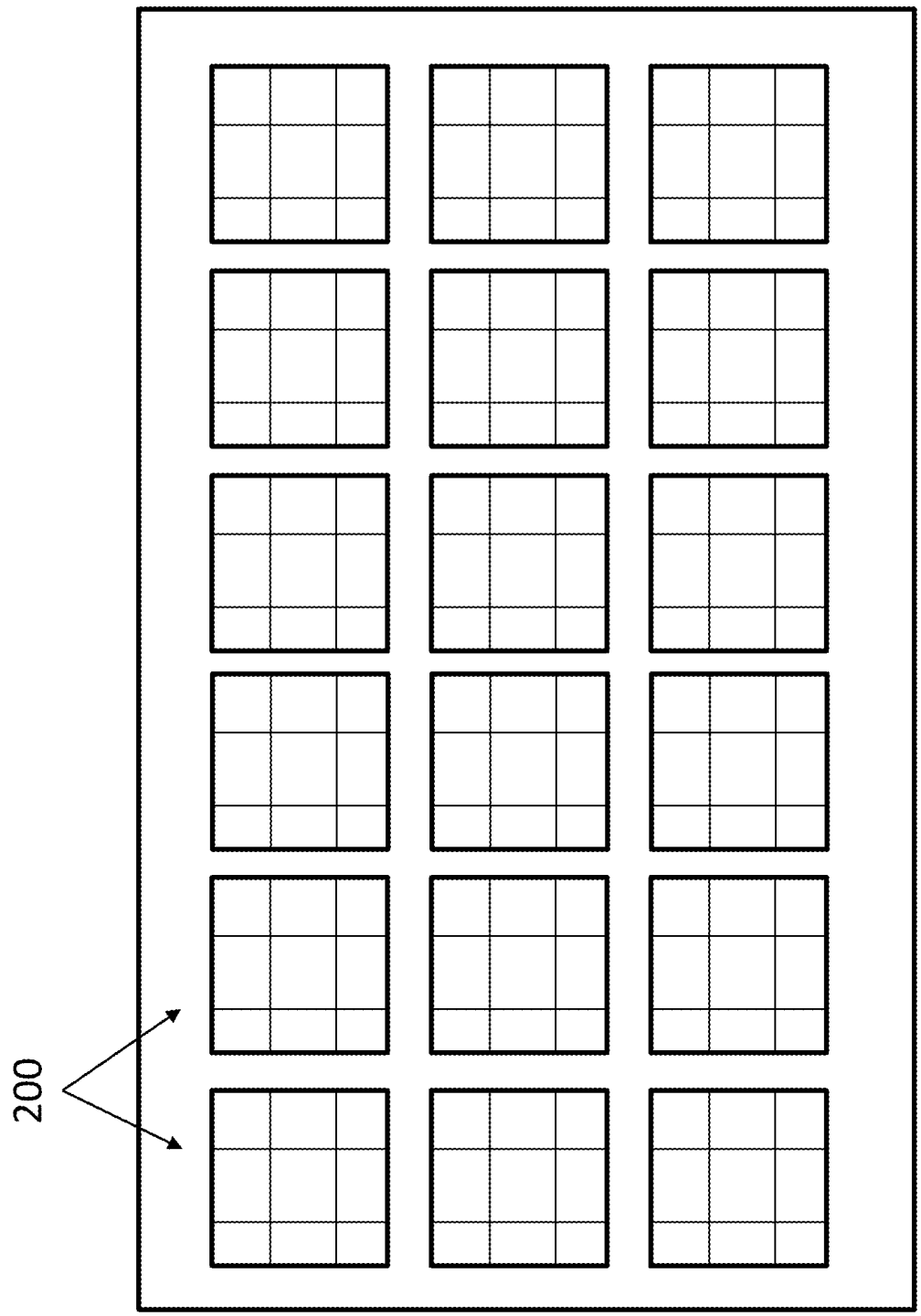
FIG. 3 illustrates a top down view of a big box roof with a plurality of modular units of packaged phase change material installed thereon according to the embodiments of the present invention.

FIG. 3 shows a big box store (e.g., Costco, Wal-Mart, etc.) with modular units of packaged phase change material 200 positioned thereon to cover a majority of the roof. The load of a big box store without the modular units of packaged phase change material can be 544,000 BTU/hour calculated as $(142-74) \times 1/R \times Area = 68 \times 0.05 \times 160,000$. With the modular units of packaged phase change material in position the load is reduced to 48,000 BTU/hour calculated as $(80-74) \times 1/R \times Area = 6 \times 0.05 \times 160,000$. In one embodiment, the weight of the modular units of packaged phase change material is 2 to 3 pounds per square foot and provide 2,240,000 BTU/hour.

In one embodiment, the modular units of packaged phase change material may be contained in a housing to protect the same from environmental elements. In one embodiment, portions of the housing are transparent to allow the reflective packaging to serve its purpose. Alternatively, the housing may be reflective while the packaging need not be reflective. In another embodiment, the modular units of packaged phase change material may be coated with a sealant or similar material to protect them from environmental elements once they are installed on the roof.

Figure 4A:
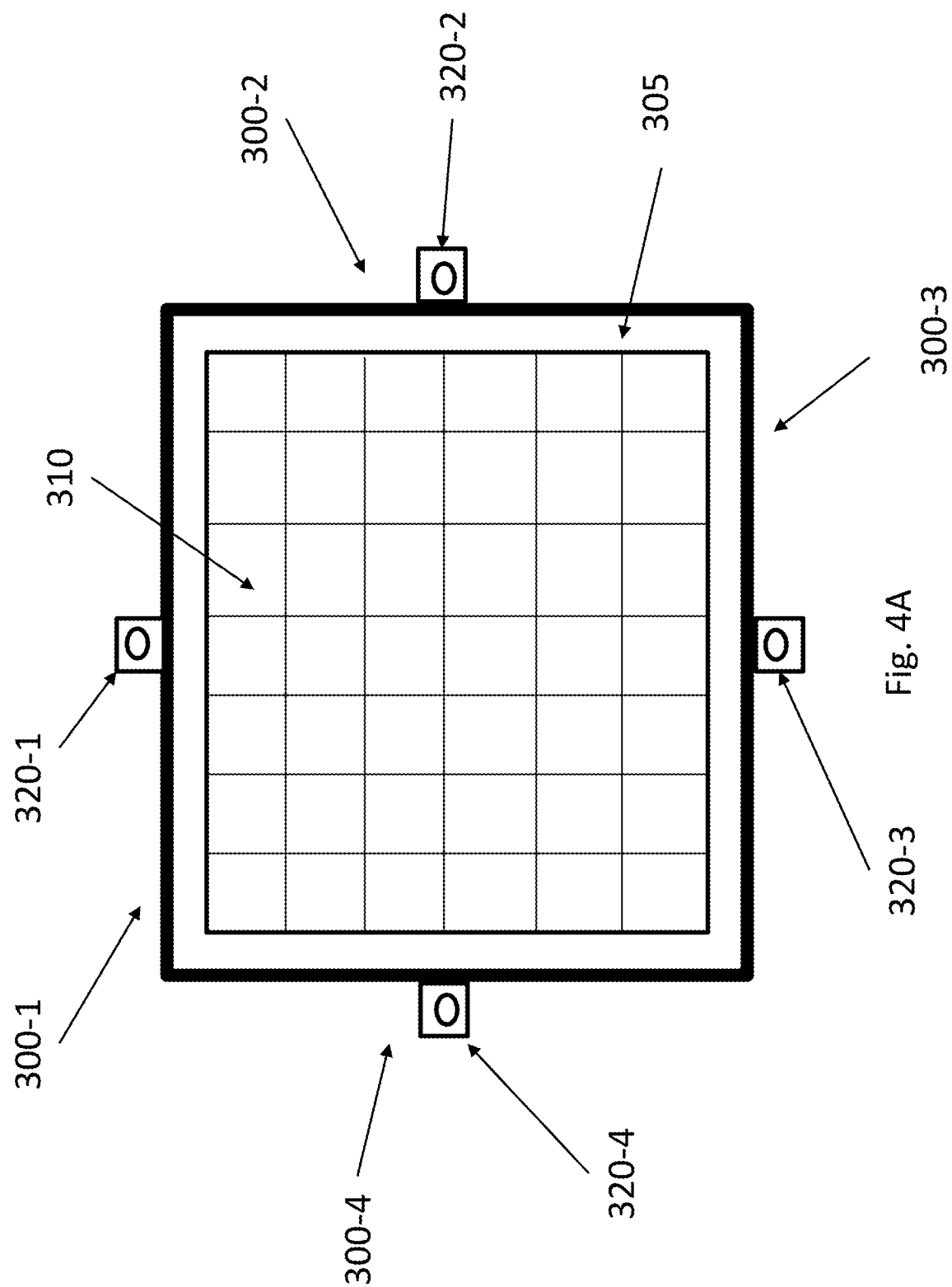
FIGS. 4A (top down view) and 4B (cut away side view) illustrate an exemplary modular unit of packaged phase change material according to the embodiments of the present invention.

In one embodiment, as shown in FIGS. 4A (top down view) and 4B (cut-away side view), the modular units of packaged phase change material 310 are contained within a housing 300 having perimeter walls 300-1 through 300-4 (defining a square in the instance), with a transparent top 305 either permanently connected or removably connected to the walls 300-1 through 300-4. The modular units of packaged phase change material 310 are positioned within the housing 300 beneath the top 305. The housing 300 may include a bottom surface 315 (e.g., sheet of aluminum) on which the modular units of packaged phase change material 310 rest or alternatively the modular units of packaged phase change material 310 may rest directly on the roof of the structure. The walls 300-1 through 300-4 may be fabricated of any suitable material but preferably the material reflects light and does not absorb significant heat (e.g. aluminum or copper). The transparent top 305 may be glass, acrylic, acrylic glass, plexiglass or other transparent materials. Alternatively, the top 305 may also be formed of a reflective material.

FIGS. 4A and 4B also show exemplary L-shaped brackets 320-1 through 320-1 for attaching said modular units of phase change material 310 to the roof of a structure via the housing 300. Without a housing 300 in place, the modular units of phase change material 310 may utilize the L-shaped brackets 320-1 through 320-4 directly for attachment to the roof. Openings in the L-shaped brackets 320-1 through 320-4 allow passage of a screw, nail or similar fasteners. As set forth above, any suitable attachment means may be utilized to attach the modular units of phase change material 310 and/or housing to the roof of a structure.

In one embodiment, the system meets cool roof initiatives. A cool roof is one that has been designed to reflect more sunlight and absorb less heat than a conventional roof. Using infrared reflective and ultraviolet stable materials for the modular units of packaged phase change material along with the heat absorption of the phase change material serves to potentially create a cool roof. The embodiments of the present invention may also be used to reduce heating loads associated with the structure.

Although the invention has been described in detail with reference to several embodiments, additional variations and modifications exist within the scope and spirit of the invention as described.

We claim:

1. A thermal storage system comprising:
    one or more rigid housings, each of said one or more rigid housing having one or more side walls and a transparent top defining an enclosed area, each of said one or more rigid housings retaining one or more units of packaged phase change material within said enclosed area and beneath said transparent top;
    means to secure said one or more rigid housings of packaged phase change material to an exterior surface of a roof of a structure such that direct sunlight may pass through said transparent top and directly contact said units of packaged phase change material within said enclosed area and beneath said transparent top, said means to secure said one or more rigid housings of packaged phase change material to an exterior surface of a roof of a structure comprising brackets connected to said housing, said brackets including an opening for passage of a fastener; and
    wherein said phase change material is packaged in an infrared reflective and ultraviolet material.

2. The thermal storage system of claim 1 wherein said one or more rigid housings further comprise a bottom surface.

3. The thermal storage system of claim 1 wherein said means to secure said one or more rigid housings to a roof of a structure comprises mechanical fasteners, adhesives and magnets.

4. A thermal storage system comprising:
    modular units of packaged phase change material;
    a rigid housing having one or more side walls and a transparent top defining an enclosed area, said rigid housing retaining one or more of said modular units of packaged phase change material within said enclosed area and beneath said transparent top;
    means to secure said rigid housing to an exterior surface of a roof of a structure such that direct sunlight may pass through said transparent top and directly contact said units of packaged phase change material within said common enclosed area, said means to secure said one or more rigid housings of packaged phase change material to an exterior surface of a roof of a structure comprising brackets connected to said housing, said brackets including an opening for passage of a fastener; and
    wherein said phase change material is packaged in infrared reflective and ultraviolet material.

5. The thermal storage system of claim 4 wherein said rigid housing further comprises a bottom surface.

6. The thermal storage system of claim 4 wherein said means to secure said rigid housing to a roof of said structure comprises mechanical fasteners, adhesives and magnets.

7. A thermal storage system comprising:
    a plurality of modular units of packaged phase change material, said phase change material is packaged in infrared reflective and ultraviolet material;
    one or more rigid housings each having one or more side walls and a transparent top defining an enclosed area, each of said one or more rigid housings retaining one or more of said modular units of packaged phase change material within said enclosed area and beneath said transparent top; and wherein said rigid housings are attached to an exterior surface of a roof of a structure such that direct sunlight may pass through said transparent top and directly contact said units of packaged phase change material within said enclosed area and beneath said transparent top, said rigid housings attached to an exterior surface of a roof of a structure via brackets connected to said housing, said brackets including an opening for passage of a fastener.

8. The thermal storage system of claim 7 wherein each of said one or more rigid housings further comprises a bottom surface.

9. The thermal storage system of claim 7 further comprising means to secure said one or more rigid housings to a roof of said structure including mechanical fasteners, adhesives and magnets.

\* \* \* \* \*